(12) United States Patent
Ma et al.

(10) Patent No.: US 11,685,251 B2
(45) Date of Patent: Jun. 27, 2023

(54) PLANETARY GEAR TRAIN TRANSMISSION DEVICE OF HYBRID VEHICLE

(71) Applicant: HARBIN DONGAN AUTOMOTIVE ENGINE MANUFACTURING CO., LTD., Harbin (CN)

(72) Inventors: Jing Ma, Harbin (CN); Lin Yang, Harbin (CN); Wei Guan, Harbin (CN); Shutao Yao, Harbin (CN); Binlong Li, Harbin (CN); Junyuan Su, Harbin (CN); Ming Song, Harbin (CN); Chaowei Li, Harbin (CN); Chongsheng Bi, Harbin (CN); Jing Bai, Harbin (CN); Hongyuan Zhao, Harbin (CN); Wensheng Wu, Harbin (CN); Hong Zhou, Harbin (CN); Xueyong Han, Harbin (CN); Ling Mu, Harbin (CN)

(73) Assignee: HARBIN DONGAN AUTOMOTIVE ENGINE MANUFACTURING CO., LTD., Harbin (CN)

(*) Notice: Subject to any disclaimer, the term of this patent is extended or adjusted under 35 U.S.C. 154(b) by 0 days.

(21) Appl. No.: 17/659,776

(22) Filed: Apr. 19, 2022

(65) Prior Publication Data
US 2023/0074324 A1 Mar. 9, 2023

(30) Foreign Application Priority Data

Sep. 3, 2021 (CN) .......................... 202111034101.7

(51) Int. Cl.
*B60K 6/365* (2007.10)
*B60K 6/24* (2007.10)
(Continued)

(52) U.S. Cl.
CPC ................ *B60K 6/365* (2013.01); *B60K 6/24* (2013.01); *B60K 6/26* (2013.01); *B60K 6/38* (2013.01);
(Continued)

(58) Field of Classification Search
CPC . B60K 6/365; B60K 6/24; B60K 6/26; B60K 6/38; B60K 6/44; B60K 6/547; F16H 3/666; F16H 2200/202
See application file for complete search history.

(56) References Cited

U.S. PATENT DOCUMENTS 6,962,545 B2 * 11/2005 Larkin .................. B60W 20/00
475/5
7,252,613 B2 * 8/2007 Bucknor ................. F16H 3/728
475/5
(Continued)

*Primary Examiner* — Tinh Dang
(74) *Attorney, Agent, or Firm* — M&B IP Analysts, LLC

(57) ABSTRACT

A planetary gear train transmission device of a hybrid vehicle is provided, which belongs to the technical field of transmissions. A transmission device of a hybrid vehicle based on a planetary gear train, which has a simple structure and is convenient to maintain is provided. The transmission device is composed of two motors, two clutches, one simple planetary gear train, and one complex planetary gear train. One motor is mainly used for generating power, and the other motor is used for driving the vehicle to move forward and brake to recover energy. Selection of different speed ratios and different working modes can be achieved by means of different combinations of the clutches and the planetary gear trains and different working states of the engine and the two motors. The present disclosure is convenient to control, has a compact structure, and adopts a few of parts.

9 Claims, 16 Drawing Sheets

(51) Int. Cl.
    *B60K 6/38*    (2007.10)
    *B60K 6/44*    (2007.10)
    *F16H 3/66*    (2006.01)
    *B60K 6/547*    (2007.10)
    *B60K 6/26*    (2007.10)

(52) U.S. Cl.
    CPC .............. *B60K 6/44* (2013.01); *F16H 3/666* (2013.01); *B60K 6/547* (2013.01); *F16H 2200/202* (2013.01)

(56) References Cited

U.S. PATENT DOCUMENTS

| | | | |
|---|---|---|---|
| 7,363,996 B2 * | 4/2008 | Kamada | B60L 50/61 903/917 |
| 7,833,119 B2 * | 11/2010 | Klemen | F16H 3/728 475/5 |
| 7,918,756 B2 * | 4/2011 | Goldschmidt | F16H 3/728 475/5 |
| 2006/0108162 A1 * | 5/2006 | Tabata | B60K 6/405 180/65.23 |
| 2009/0275437 A1 * | 11/2009 | Kersting | B60K 6/26 903/910 |

* cited by examiner

PLANETARY GEAR TRAIN TRANSMISSION DEVICE OF HYBRID VEHICLE

CROSS REFERENCE TO RELATED APPLICATION

This patent application claims the benefit and priority of Chinese Patent Application No. 202111034101.7, filed on Sep. 3, 2021, the disclosure of which is incorporated by reference herein in its entirety as part of the present application.

TECHNICAL FIELD

The present disclosure belongs to the technical field of transmissions, in particular to a planetary gear train transmission device of a hybrid vehicle.

BACKGROUND ART

With the rapid development and technological innovation of the automobile industry, new energy hybrid power plants have been more and more widespread applied to the field of transmissions, so that various power combination forms of an engine, a power generator, and a motor can be satisfied, and the respective advantages of the engine and the motor can be fully exerted. Like a traditional fuel vehicle, the new energy hybrid power plants can meet the requirement for an endurance mileage and have low requirements for infrastructures. Like a full electric vehicle, the new energy hybrid power plants can meet the economic requirement. In the next few years, it is an important development direction of new energy vehicles. A planetary gear train can convert large speed ratio changes and can achieve different power combination modes with fewer parts in cooperation with a clutch. The spatial structure is small in size and relatively light in weight, which is an important implementation form of a transmission device of a hybrid vehicle.

However, the existing hybrid power plant has the problems of complex structure, a large number of parts, high part cost and high machining difficulty.

SUMMARY

The present disclosure aims to overcome the shortcomings in the prior art and provide a transmission device of a hybrid vehicle based on a planetary gear train, which has a simple structure and is convenient to maintain.

The technical solution adopted by the present disclosure to solve the technical problem is as follows: A planetary gear train transmission device of a hybrid vehicle includes an input shaft, an output shaft, a front-end motor, a rear-end motor, a first clutch, and a second clutch. One end of the input shaft is connected to an engine power system, and the other end of the input shaft is connected to the front-end motor through a front-end planetary gear train. The second clutch is mounted between the other end of the input shaft and the output shaft. The first clutch is mounted between the front-end planetary gear train and the output shaft. The rear-end motor is connected to the output shaft through a rear-end planetary gear train. Selection of different speed ratios and different working modes can be achieved by means of different combinations of the first clutch and the second clutch and different working states of the engine, the rear-end motor, and the front-end motor.

Further, the front-end planetary gear train includes a first sun wheel, a first planetary wheel, a second sun wheel, a second planetary wheel, a second outer tooth ring, and a second planetary frame; the rear-end planetary gear train includes a third sun wheel, a third planetary wheel, a third outer tooth ring, and a third planetary frame. In the front-end planetary gear train, the second outer tooth ring is fixedly constrained. The first planetary wheel is rigidly connected to the second planetary wheel. The second sun wheel and the second planetary frame form a speed ratio relation. The first sun wheel and the second planetary frame form a speed ratio relation. The first sun wheel and the second sun wheel form a speed ratio relation.

The other end of the input shaft is connected to the second sun wheel and one end of a second clutch inner hub. The other end of the second clutch inner hub is connected to the second clutch. One end of the second planetary frame is connected to one end of the first clutch. The first clutch and the second clutch are jointly connected to one end of a clutch frame, and the other end of the clutch frame and one end of the third planetary frame are jointly connected to the output shaft.

The rear-end motor is connected to the third sun wheel, and the third outer tooth ring is fixedly mounted on a housing.

The front-end motor is connected to the first sun wheel. The second planetary wheel and the first planetary wheel are mounted on the second planetary frame. The second outer tooth ring is fixedly mounted on the housing.

Further, when the transmission device is in mode I-electric vehicle (EV): the first clutch and the second clutch are both disengaged, the engine and the front-end motor do not work, and the rear-end motor alone outputs power serving as a power source of the transmission device.

Further, when the transmission device is in mode II-series connection: the first clutch and the second clutch are disengaged, the engine outputs power, and the front-end motor receives the power output from the engine and transmits the received power to the rear-end motor or stores the power energy in a battery. The rear-end motor outputs power. The power source of the rear-end motor is the front-end motor or the battery.

Further, when the transmission device is in mode III-direct drive I: the first clutch is engaged, the second clutch is disengaged, and the rear-end motor does not work. When the battery has sufficient electricity, the front-end motor does not receive the power. When the battery is required to be charged, the front-end motor receives part of the power output by the engine, and the engine outputs power that is a power output of the transmission device.

Further, when the transmission device is in mode IV-direct drive II: the first clutch is disengaged, the second clutch is engaged, and the rear-end motor does not work. When the battery has sufficient electricity, the front-end motor does not receive the power. When the battery is required to be charged, the front-end motor receives part of the power output by the engine, and the engine outputs power that is a power output of the transmission device.

Further, when the transmission device is in mode V-parallel connection I: the first clutch is engaged, and the second clutch is disengaged. When the battery has sufficient electricity, the front-end motor does not work. When the battery is required to be charged, the front-end motor receives part of the power output by the engine, and the engine and the rear-end motor output power that is a power output of the transmission device.

Further, when the transmission device is in mode VI-parallel connection II: the first clutch is disengaged, and the second clutch is engaged. When the battery has sufficient electricity, the front-end motor does not work. When the battery is required to be charged, the front-end motor receives part of the power output by the engine, and the engine and the rear-end motor output power that is a power output of the transmission device.

Further, when the transmission device is in mode VII-braking recovery: the first clutch and the second clutch are both disengaged. The rear-end motor receives power generated by deceleration braking of a wheeling system.

Further, when the transmission device is in mode VIII-idle power generation: the first clutch and the second clutch are both disengaged. The rear-end motor does not work, and the front-end motor receives the power output by the engine and stores the received power energy in the battery.

The present disclosure has the beneficial effects:

1. Various power combination forms of an engine, a power generator, and a motor can be satisfied, and the respective advantages of the engine and the motor can be fully exerted. Like a traditional fuel vehicle, the transmission device can meet the requirement for an endurance mileage and have low requirements for infrastructures. Like a full electric vehicle, the transmission device can meet the economic requirement.

2. Due to the two clutches and the compound planetary gear train, the planetary gear train transmission device of the hybrid vehicle of the present disclosure has two engine direct gears. The two engine direct gears have the advantages that: the anxiety of a vehicle owner about a failure in charging a vehicle-mounted battery in time, a motor system fault and the like is reduced. The transmission device has an engine direct drive mode, so that no matter the vehicle speed is high or low, the engine can work in an optimal efficiency range. When the entire vehicle is at a low speed, the transmission speed ratio is large, and a low-speed gear meets the dynamic property requirement. When the entire vehicle is at a high speed, the transmission speed ratio is small, and a high-speed gear meets the economic requirement.

3. A planetary gear train can convert large speed ratio changes and can achieve different power combination modes with fewer parts in cooperation with the clutch. The spatial structure is small in size and relatively light in weight. The front-end planetary gear train is a compound planetary gear train which has an extremely simple structure and only includes two sun wheels, one planetary wheel assembly, one outer tooth ring, and one planetary frame, so that it is easy to overall implement and has low cost.

4. The present disclosure is convenient to control, has a compact structure, and adopts a few of parts. The clutches and the planetary gear trains are easily assembled, and the part cost and machining difficulty are low. The transmission device has the characteristics of reasonable structure, easy assembling, capability of achieving multiple operation modes, and high cost performance.

Figure 1:
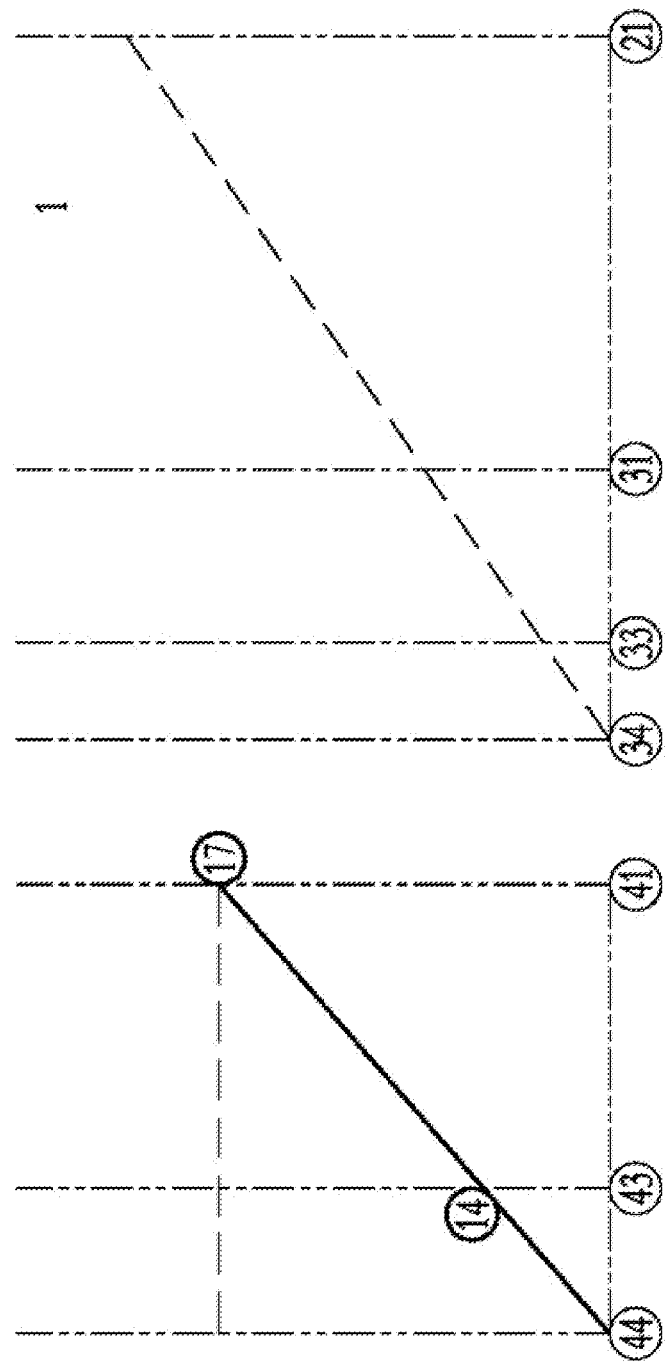
FIG. 1 is a leverage diagram of mode 1-EV.
Figure 2:
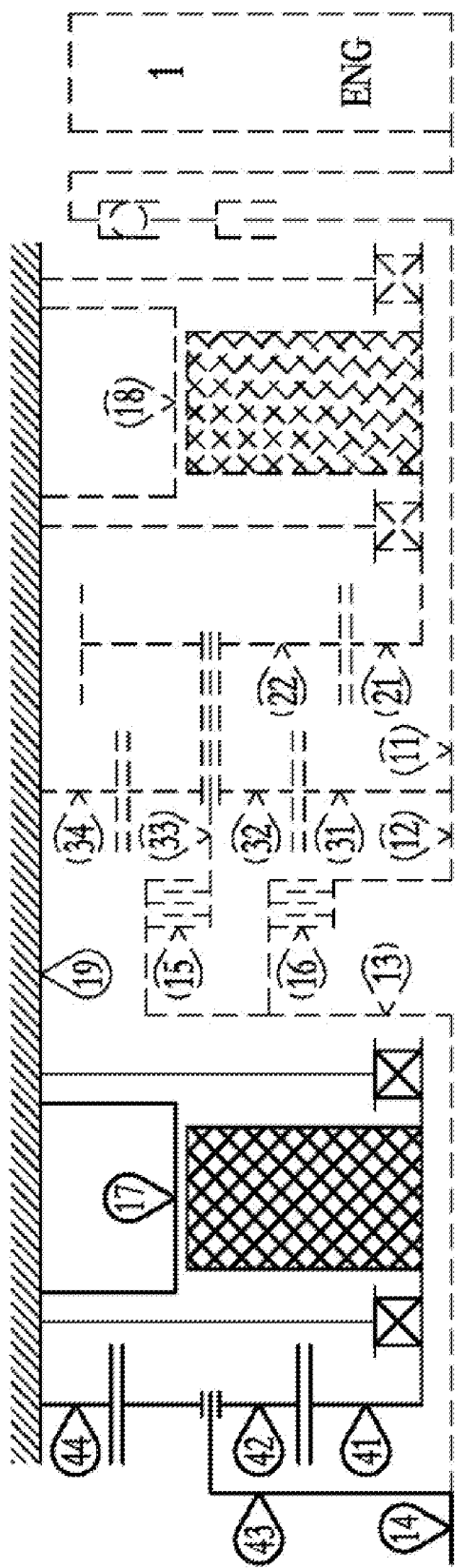
FIG. 2 is a schematic structural diagram of mode 1-EV.
Figure 3:
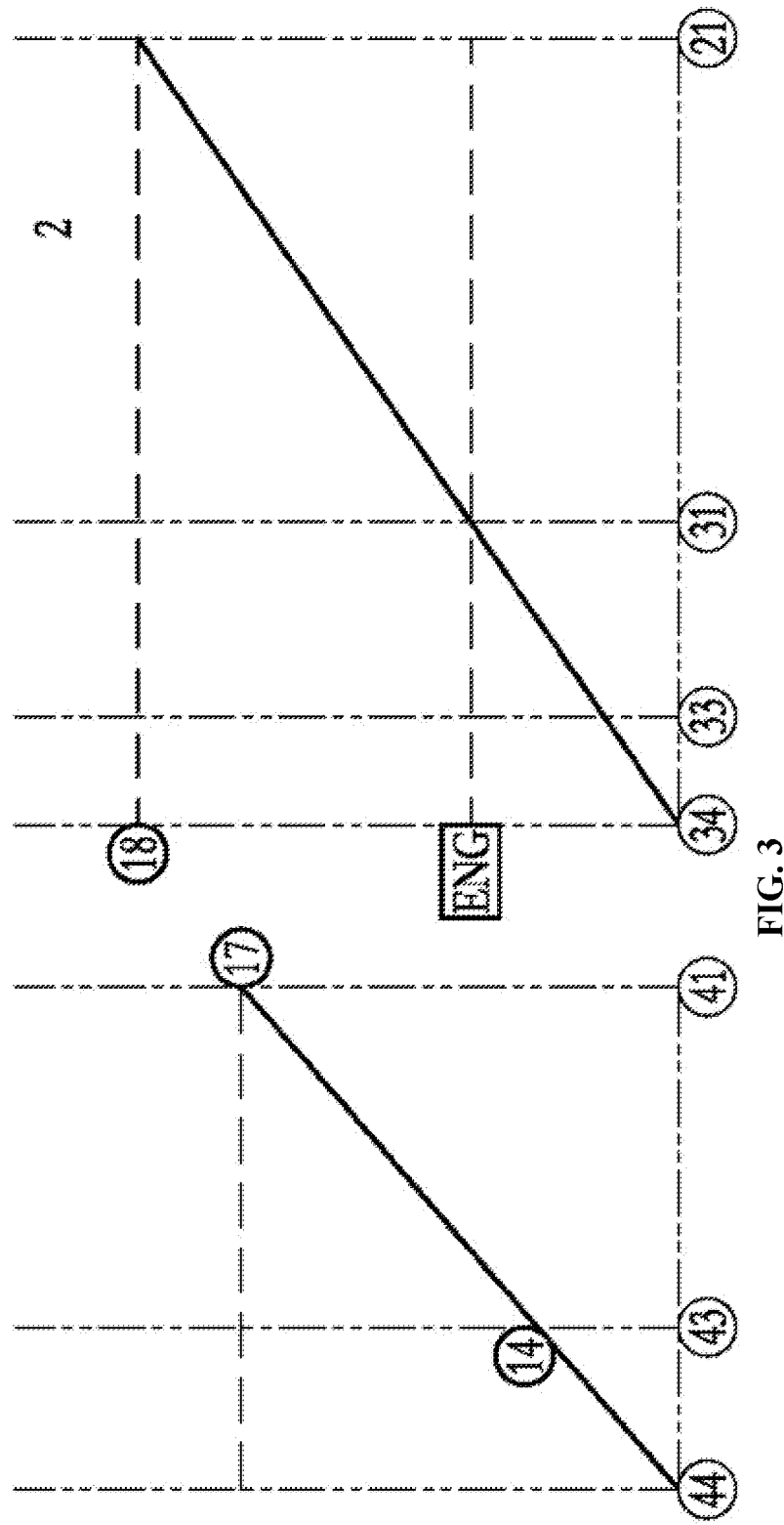
FIG. 3 is a leverage diagram of mode 2-serial connection.
Figure 4:
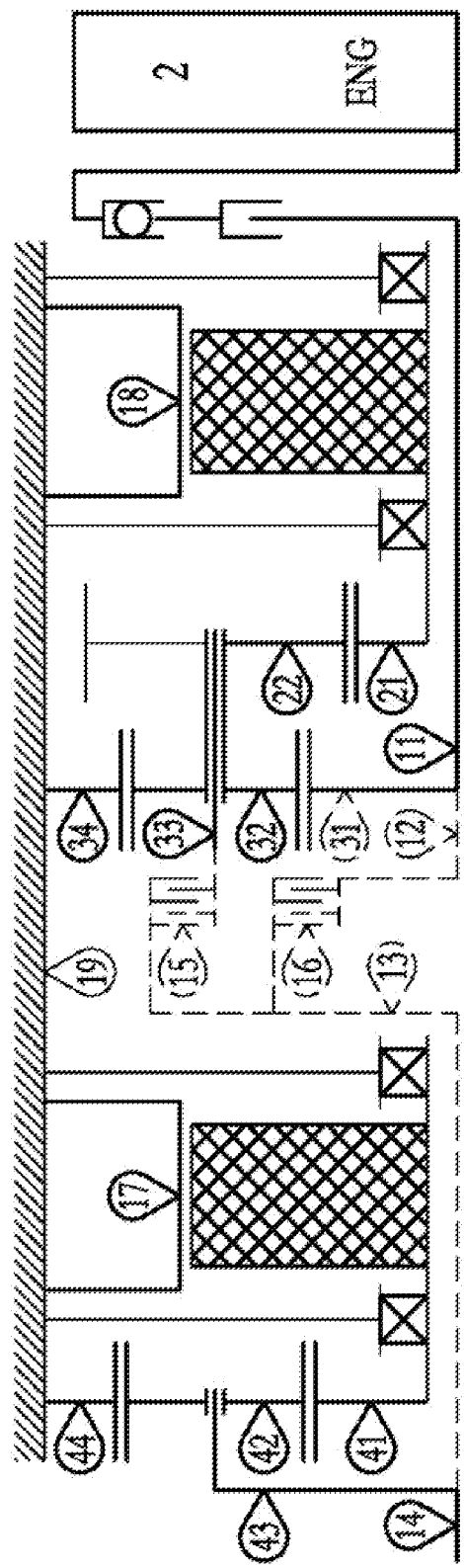
FIG. 4 is a schematic structural diagram of mode 2-serial connection.
Figure 5:
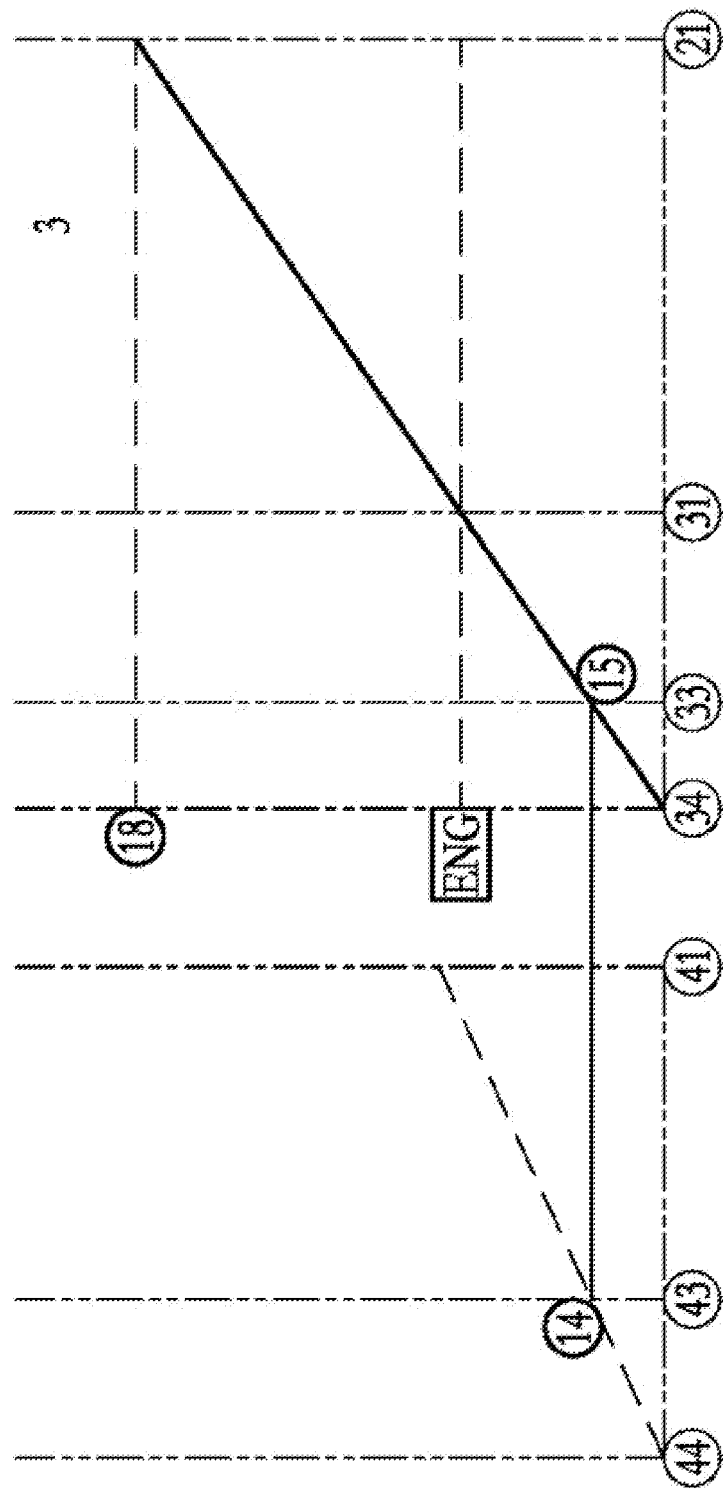
FIG. 5 is a leverage diagram of mode 3-direct drive 1.
Figure 6:
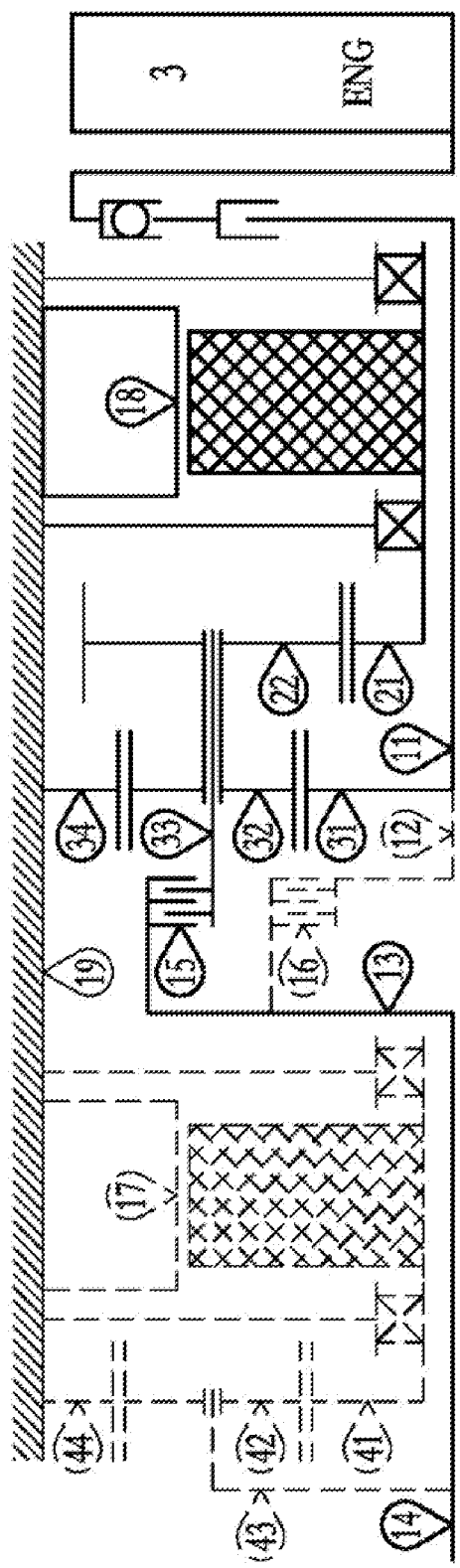
FIG. 6 is a schematic structural diagram of mode 3-direct drive 1.
Figure 7:
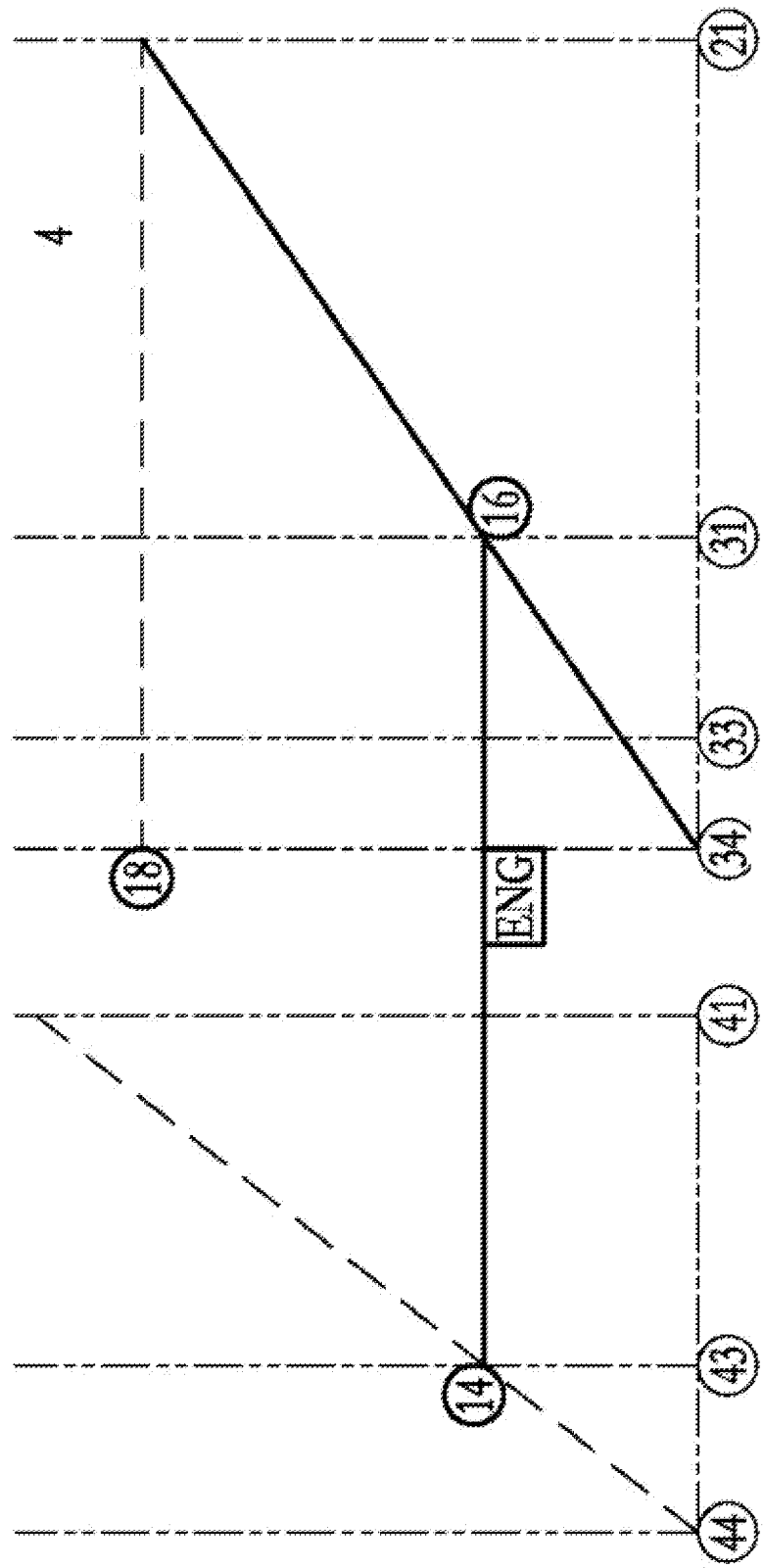
FIG. 7 is a leverage diagram of mode 4-direct drive 2.
Figure 8:
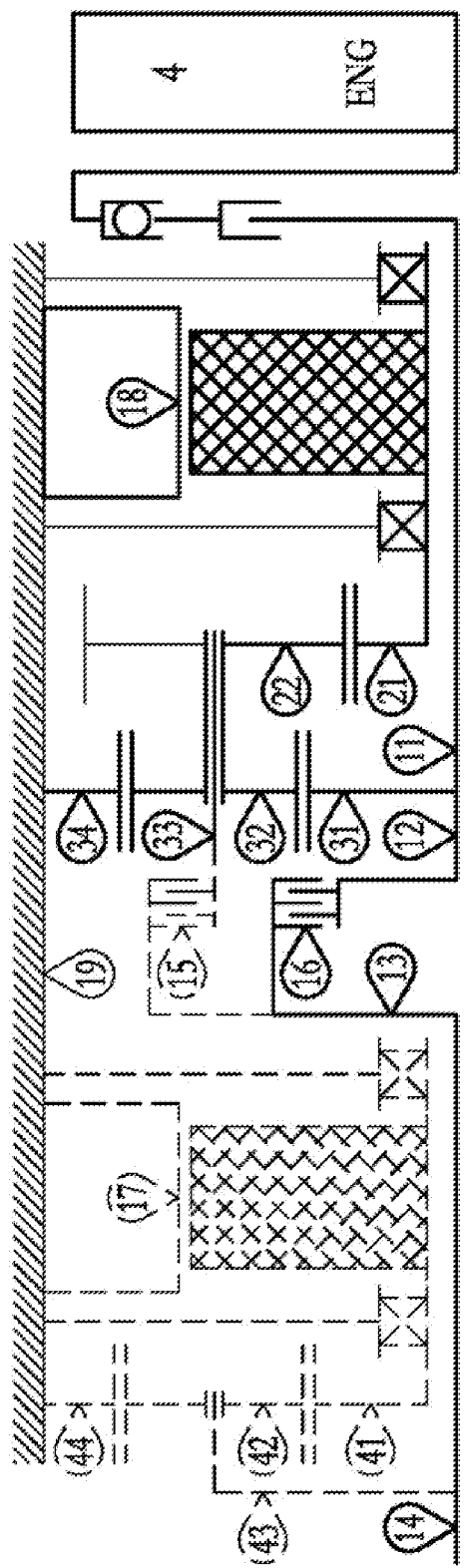
FIG. 8 is a schematic structural diagram of mode 4-direct drive 2.
Figure 9:
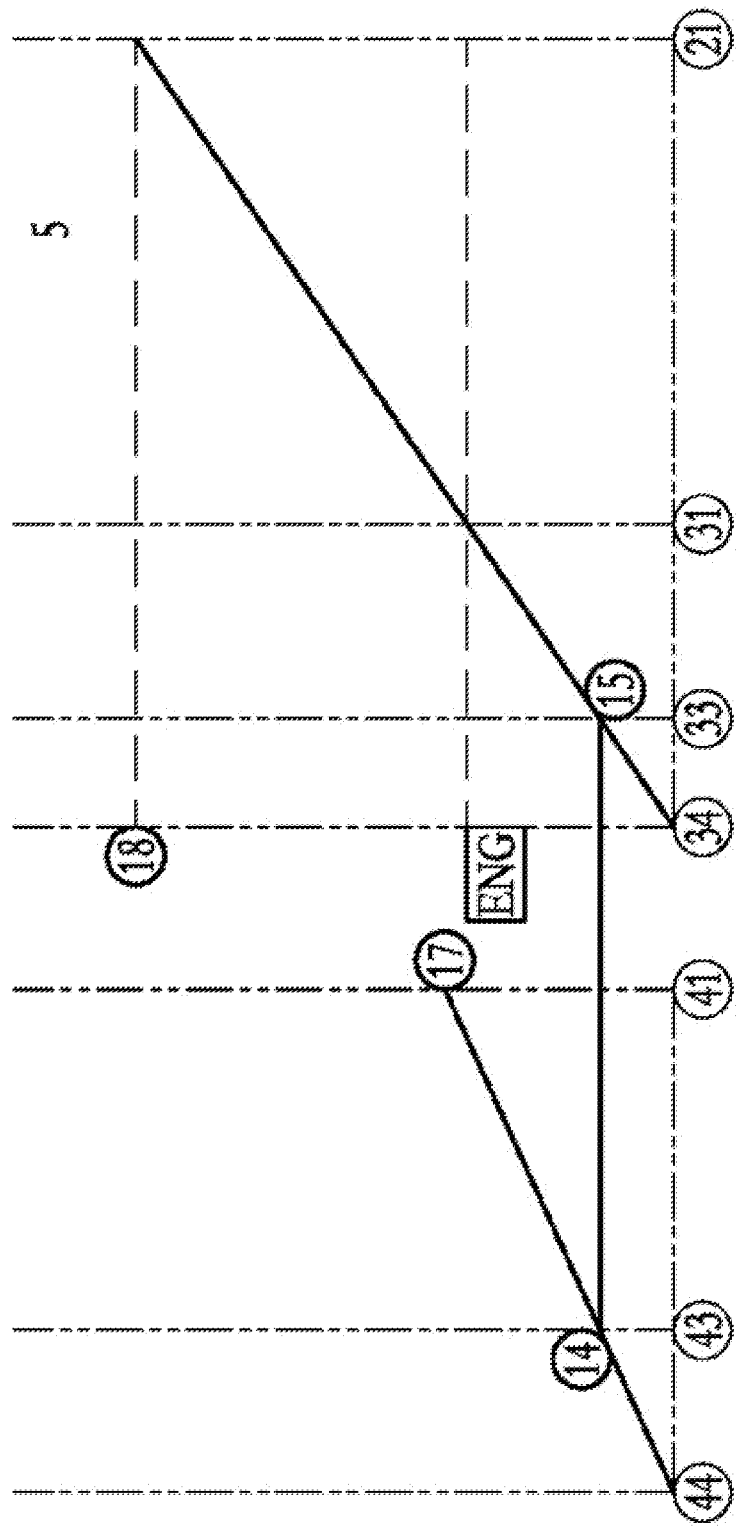
FIG. 9 is a leverage diagram of mode 5-parallel connection 1.
Figure 10:
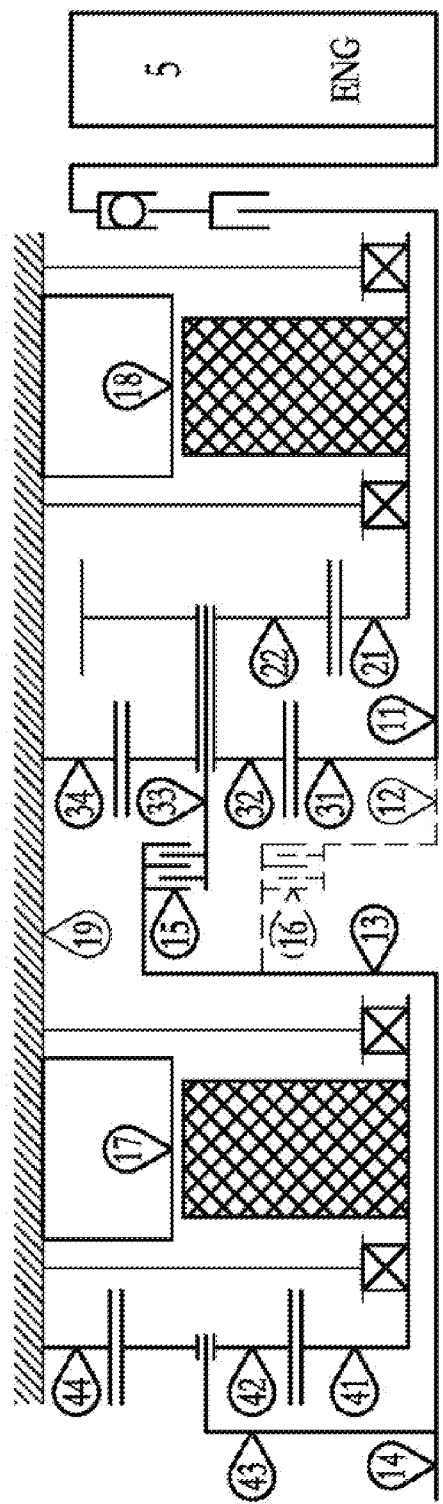
FIG. 10 is a schematic structural diagram of mode 5-parallel connection 1.
Figure 11:
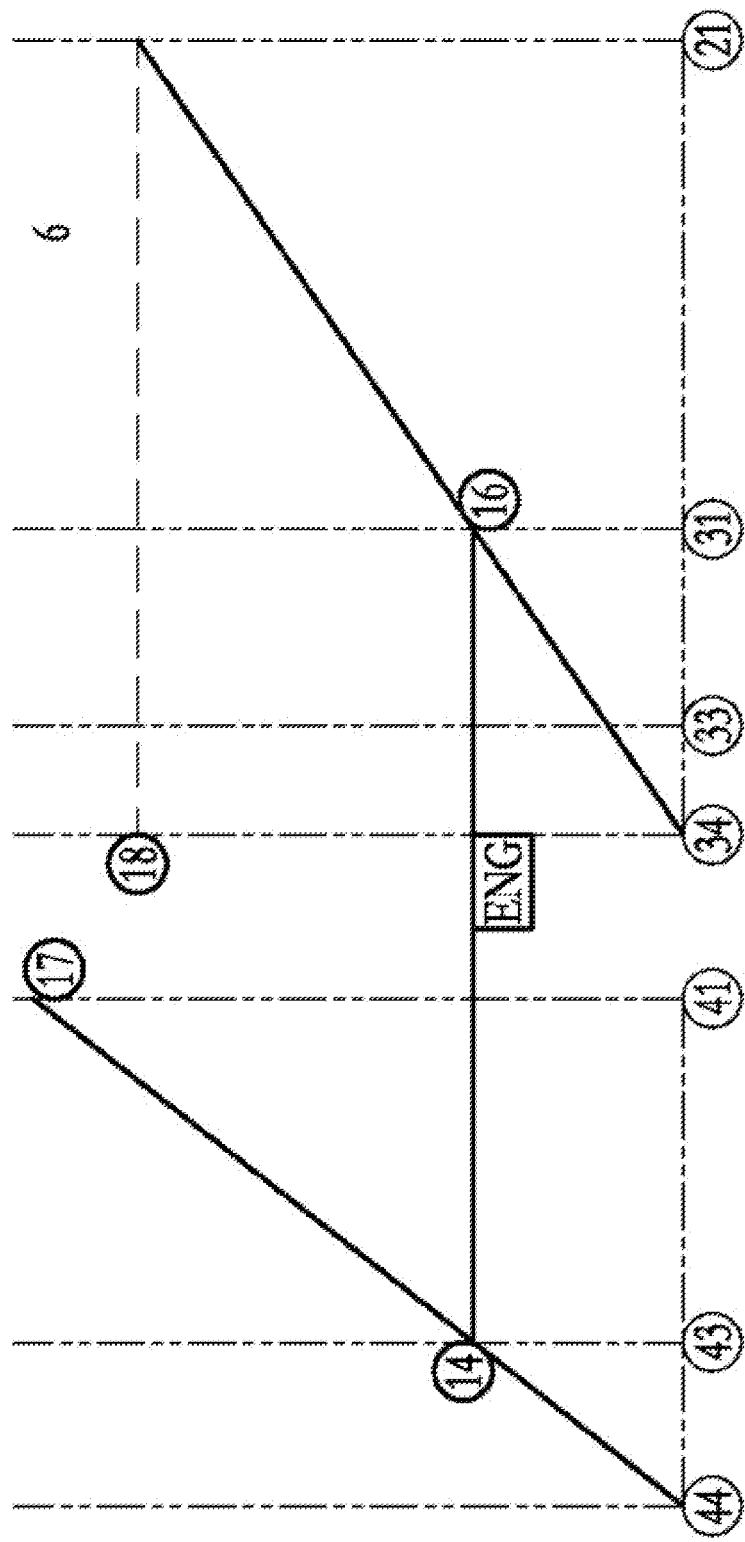
FIG. 11 is a leverage diagram of mode 6-parallel connection 2.
Figure 12:
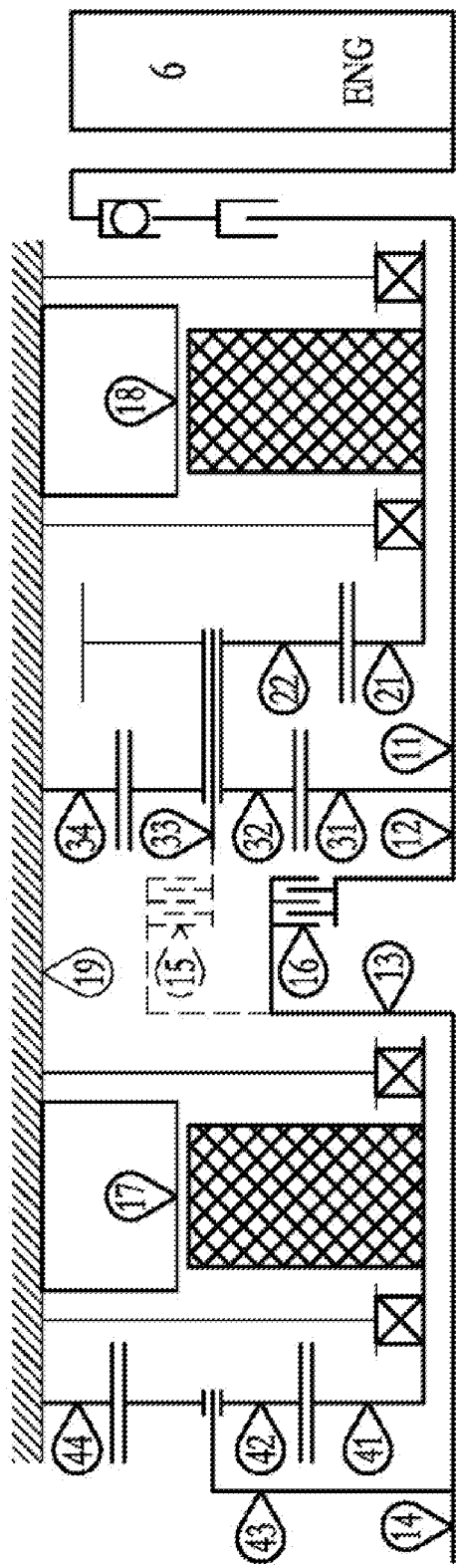
FIG. 12 is a schematic structural diagram of mode 6-parallel connection 2.
Figure 13:
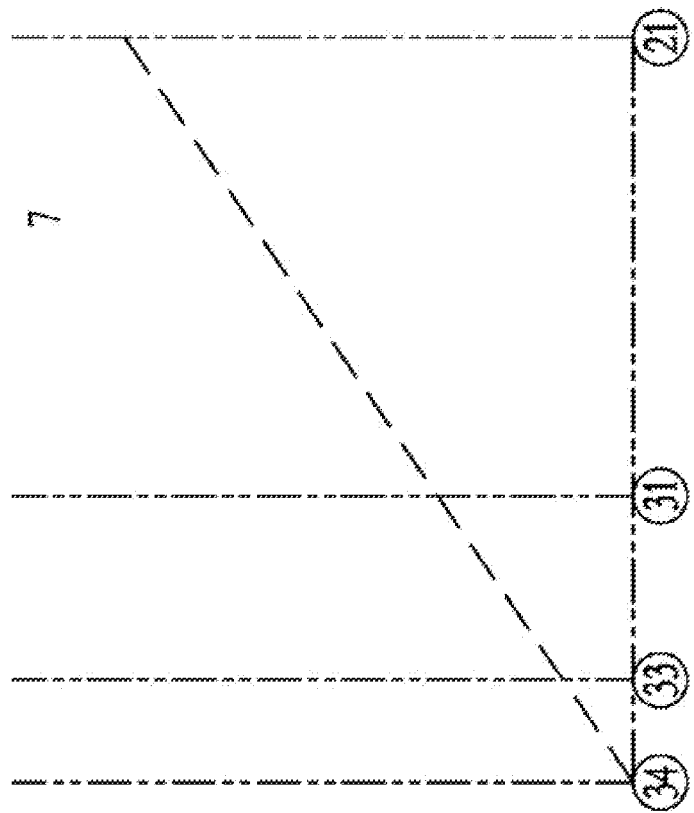
FIG. 13 is a leverage diagram of mode 7-braking recovery.
Figure 13:
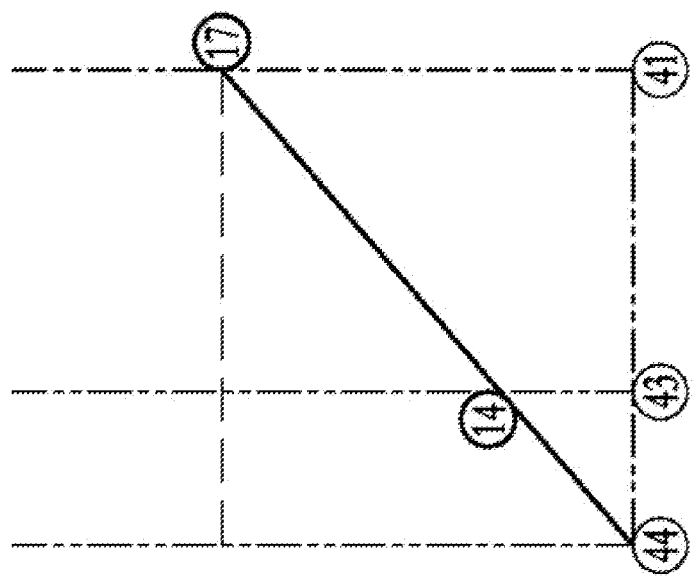
Figure 14:
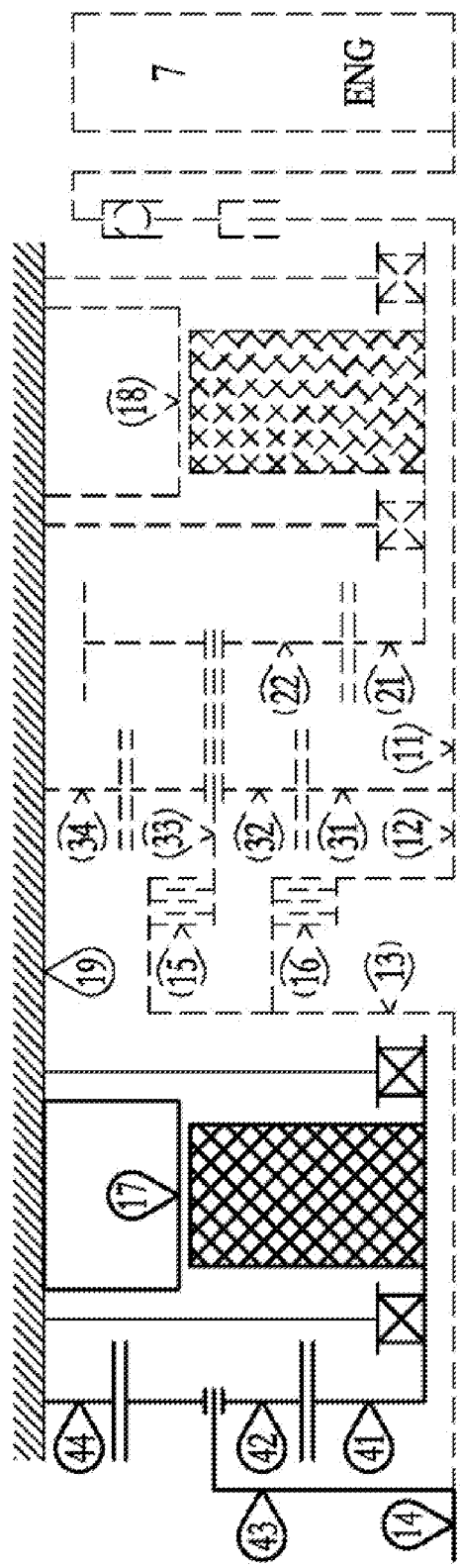
FIG. 14 is a schematic structural diagram of mode 7-braking recovery.
Figure 15:
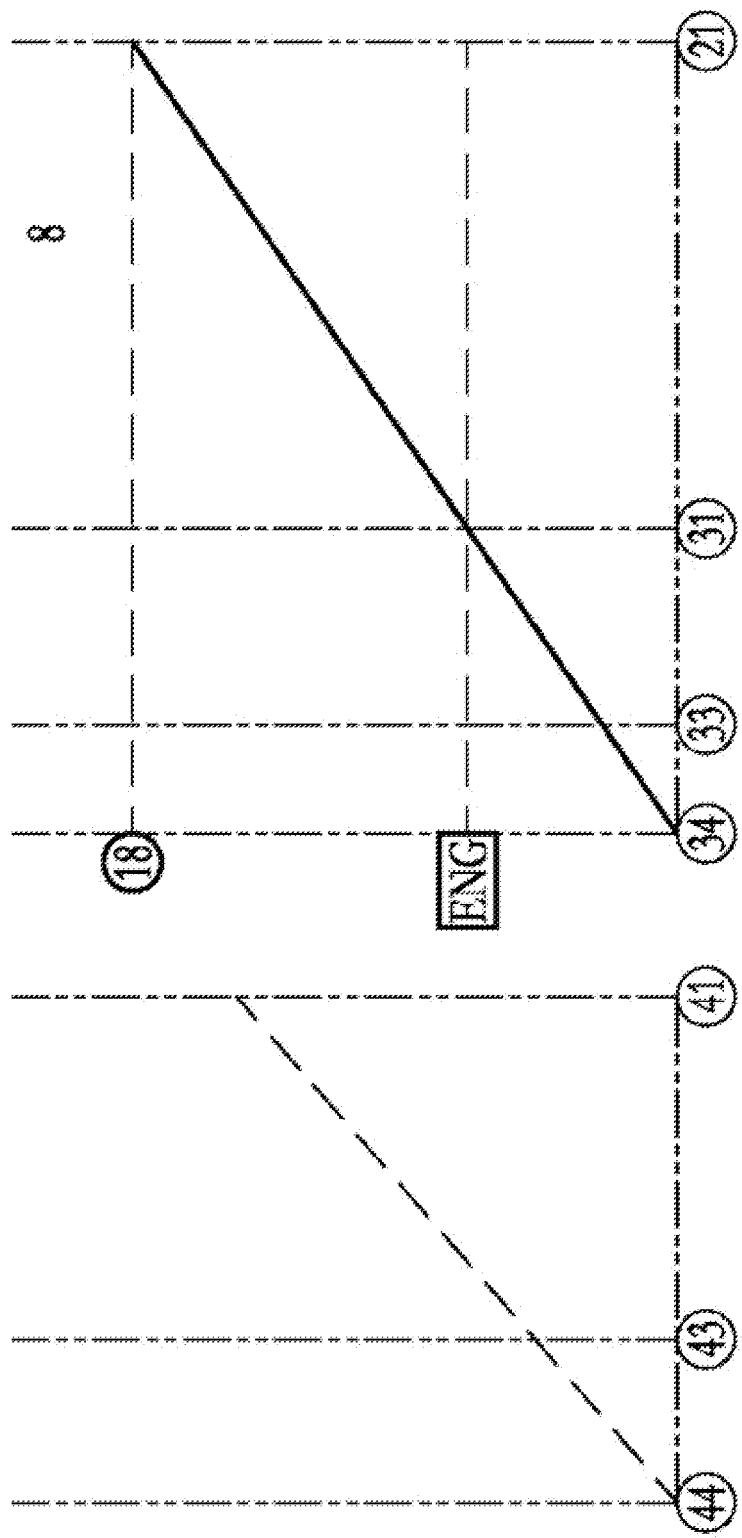
FIG. 15 is a leverage diagram of mode 8-idle power generation.
Figure 16:
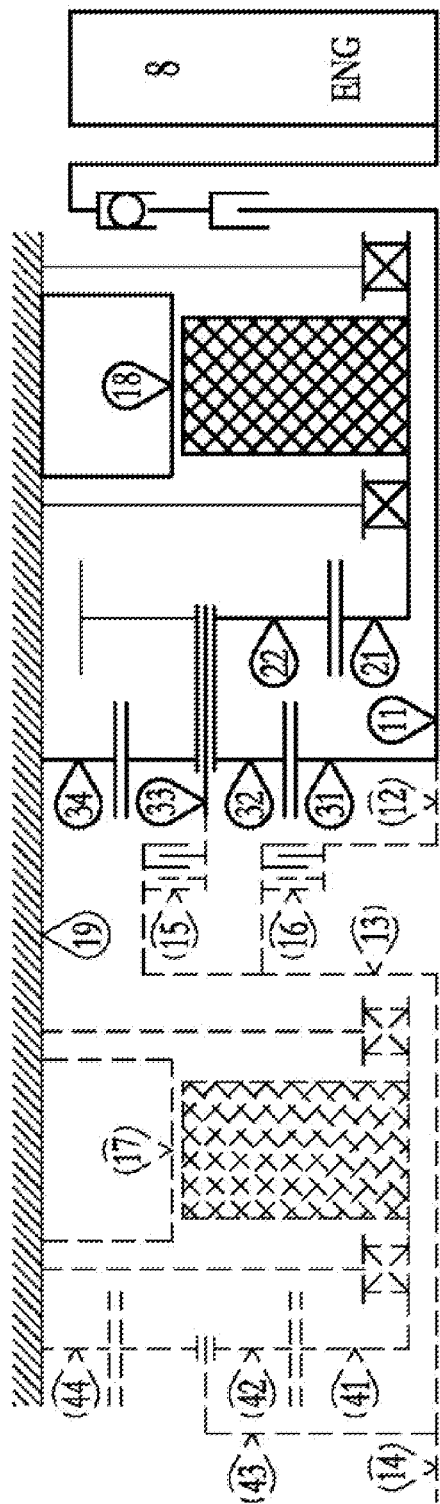
FIG. 16 is a schematic structural diagram of mode 8-idle power generation.

11: input shaft; 12: second clutch inner hub; 13: clutch frame; 14: output shaft; 15: first clutch; 16: second clutch; 17: rear-end motor; 18: front-end motor; 19: housing; 21: first sun wheel; 22: first planetary wheel; 31: second sun wheel; 32: second planetary wheel; 33: second planetary frame; 34: second outer tooth ring; 41: third sun wheel; 42: third planetary wheel; 43: third planetary frame; 44: third outer tooth ring.

DETAILED DESCRIPTION OF THE EMBODIMENTS

In order to better understand the objectives, structures, and functions of the present disclosure, the present disclosure is further described in detail below in combination with the accompanying drawings.

A planetary gear train transmission device of a hybrid vehicle includes an input shaft 11, a second clutch inner hub 12, a clutch frame 13, an output shaft 14, a first clutch 15, a second clutch 16, a rear-end motor 17, a front-end motor 18, a front-end planetary gear train, and a rear-end planetary gear train. The front-end planetary gear train includes a first sun wheel 21, a first planetary wheel 22, a second sun wheel 31, a second planetary wheel 32, a second outer tooth ring 34, and a second planetary frame 33. The rear-end planetary gear train includes a third sun wheel 41, a third planetary wheel 42, a third outer tooth ring 44, and a third planetary frame 43. In the front-end planetary gear train, the second outer tooth ring 34 is fixedly constrained. The first planetary wheel 22 is rigidly connected to the second planetary wheel 32. The second sun wheel 31 and the second planetary frame 33 form a speed ratio relation. The first sun wheel 21 and the second planetary frame 33 form a speed ratio relation. The first sun wheel 21 and the second sun wheel 31 form a speed ratio relation.

The planetary gear train transmission device of the hybrid vehicle has three power plants: the engine power system the rear-end motor 17, and the front-end motor 18.

One end of the input shaft 11 is connected to the engine power system, and the other end of the input shaft 11 is connected to the front-end motor 18 through the front-end planetary gear train, and the second clutch 16 is mounted between the other end and the output shaft 14. The first clutch 15 is mounted between the front-end planetary gear train and the output shaft 14. The rear-end motor 17 is connected to the output shaft 14 through the rear-end planetary gear train.

Specifically:

One end of the input shaft 11 is connected to the engine power system, and the other end of the input shaft 11 is connected to the second sun wheel 31 and one end of the second clutch inner hub 12. The other end of the second clutch inner hub 12 is connected to the second clutch 16. One end of the second planetary frame 33 is connected to one end of the first clutch 15. The first clutch 15 and the second clutch 16 are jointly connected to one end of the clutch frame 13, and the other end of the clutch frame 13 and one end of the third planetary frame 43 are jointly connected to the output shaft 14.

The rear-end motor 17 is connected to the third sun wheel 41. The third planetary wheel 42 is simultaneously in gear engagement with the third sun wheel 41 and the third outer tooth ring 44. The third planetary wheel 42 is mounted on the third planetary frame 43. The third outer tooth ring 44 is fixedly mounted on the housing 19.

The front-end motor 18 is connected to the first sun wheel 21. The first sun wheel 21 is in gear engagement with the first planetary wheel 22. The second planetary wheel 32 is simultaneously in gear engagement with the second sun wheel 31 and the second outer tooth ring 34. The second planetary wheel 32 and the first planetary wheel 22 are mounted on the second planetary frame 33. The second outer tooth ring 34 is fixedly mounted on the housing 19.

Selection of different speed ratios and different working modes can be achieved by means of different combinations of the first clutch 15 and the second clutch 16 in different working states of the engine, the rear-end motor 17, and the front-end motor 18.

Mode I-EV: the first clutch 15 and the second clutch 16 are both disengaged, the engine and the front-end motor 18 do not work, and the rear-end motor 17 alone outputs power serving as a power source of the transmission device. A power transmission path is as follows: The rear-end motor 17 transmits the power to the third sun wheel 41. The third sun wheel 41 transmits the power to the third planetary frame 43 through the rear-end planetary gear train. The third planetary frame 43 transmits the power to the output shaft 14.

Mode II-serial connection: the first clutch 15 and the second clutch 16 are both disengaged. The engine outputs power. The front-end motor 18 receives the power output by the engine and transmits the received power to the rear-end motor 17 or stores the power energy in a battery. The rear-end motor 17 outputs the power. A power source of the rear-end motor 17 is the front-end motor 18 or the battery. A power transmission path is as follows: The engine transmits the power to the second sun wheel 31. The second sun wheel 31 transmits power to the first sun wheel 21 through the front-end planetary gear train. The first sun wheel 21 transmits the power to the front-end motor 18. The rear-end motor 17 transmits the power to the third sun wheel 41. The third sun wheel 41 transmits the power to the third planetary frame 43 through the rear-end planetary gear train. The third planetary frame 43 transmits the power to the output shaft 14.

Mode III-direct drive I: the first clutch 15 is engaged, the second clutch 16 is disengaged, and the rear-end motor 17 does not work. When the battery has sufficient electricity, the front-end motor 18 does not receive power. When the battery is required to be charged, the front-end motor 18 receives part of the power output by the engine. The engine outputs power that is a power output of the transmission device. A power transmission path is as follows: The engine transmits the power to the second sun wheel 31. The second sun wheel 31 transmits the power to the second planetary frame 33 through the front-end planetary gear train. The second planetary frame 33 transmits the power to the first clutch 15, the clutch frame 13, and the output shaft 14 in sequence. When the battery is required to be charged, the second sun wheel 31 transmits part of the power to the first sun wheel 21 through the front-end planetary gear train. The first sun wheel 21 transmits the power to the front-end motor 18 and stores the received power energy in the battery.

Mode IV-direct drive II: the first clutch 15 is disengaged, the second clutch 16 is engaged, and the rear-end motor 17 does not work. When the battery has sufficient electricity, the front-end motor 18 does not receive power. When the battery is required to be charged, the front-end motor 18 receives part of the power output by the engine. The engine sends power that is a power output of the transmission device. A power transmission path is as follows: The engine transmits the power to the second sun wheel 31. The second sun wheel 31 transmits the power to the second planetary frame 33 through the front-end planetary gear train. The second planetary frame 33 transmits the power to the second clutch 16, the clutch frame 13, and the output shaft 14 in sequence. When the battery is required to be charged, the second sun wheel 31 transmits part of the power to the first sun wheel 21 through the front-end planetary gear train. The first sun wheel 21 transmits the power to the front-end motor 18 and stores the received power energy in the battery.

Mode V-parallel connection I: the first clutch 15 is engaged, and the second clutch 16 is disengaged. When the battery has sufficient electricity, the front-end motor 18 does not work. When the battery is required to be charged, the front-end motor 18 receives part of the power output by the engine. The engine and the rear-end motor 17 output power that is used as a power output of the transmission device. A power transmission path is as follows: The engine transmits the power to the second sun wheel 31. The second sun wheel 31 transmits the power to the second planetary frame 33 through the front-end planetary gear train. The second planetary frame 33 transmits the power to the first clutch 15, the clutch frame 13, and the output shaft 14 in sequence. When the battery is required to be charged, the second sun wheel 31 transmits part of the power to the first sun wheel 21 through the front-end planetary gear train. The first sun wheel 21 transmits the power to the front-end motor 18 and stores the received power energy in the battery or transmits the power to the rear-end motor 17. The rear-end motor 17 transmits the power to the third sun wheel 41. The third sun wheel 41 transmits the power to the third planetary frame 43 through the rear-end planetary gear train. The third planetary frame 43 transmits the power to the output shaft 14. The output shaft 14 receives the power outputs from the clutch frame 13 and the third planetary frame 43 at the same time.

Mode VI-parallel connection II: the first clutch 15 is disengaged, and the second clutch 16 is engaged. When the battery has sufficient electricity, the front-end motor 18 does not work. When the battery is required to be charged, the front-end motor 18 receives part of the power output by the engine. The engine and the rear-end motor 17 output power that is used as a power output of the transmission device. A power transmission path is as follows: The engine transmits the power to the second sun wheel 31. The second sun wheel 31 transmits the power to the second planetary frame 33 through the front-end planetary gear train. The second planetary frame 33 transmits the power to the second clutch 16, the clutch frame 13, and the output shaft 14 in sequence. When the battery is required to be charged, the second sun wheel 31 transmits part of the power to the first sun wheel 21 through the front-end planetary gear train. The first sun wheel 21 transmits the power to the front-end motor 18 and stores the received power energy in the battery or transmits the power to the rear-end motor 17. The rear-end motor 17 transmits the power to the third sun wheel 41. The third sun wheel 41 transmits the power to the third planetary frame 43 through the rear-end planetary gear train. The third planetary frame 43 transmits the power to the output shaft 14. The output shaft 14 receives the power outputs from the clutch frame 13 and the third planetary frame 43 at the same time.

Mode VII-braking recovery: the first clutch 15 and the second clutch 16 are both disengaged. The rear-end motor 17 receives power generated by deceleration braking of a wheeling system. A power transmission path is as follows: the output shaft 14 transmits the power to the third planetary frame 43. The third planetary frame 43 transmits the power to the third sun wheel 41 through the rear-end planetary gear train. The third sun wheel 41 transmits the power to the rear-end motor 17 and stores the received power energy in the battery.

Mode VIII-idle power generation: the first clutch 15 and the second clutch 16 are both disengaged, and the rear-end motor 17 does not work. The front-end motor 18 receives the power output by the engine and stores the received power energy in the battery. A power transmission path is as follows: The engine transmits the power to the second sun wheel 31. The second sun wheel 31 transmits the power to the first sun wheel 21 through the front-end planetary gear train. The first sun wheel 21 transmits the power to the front-end motor 18.

It can be understood that the present disclosure is described by some embodiments. Those skilled in the art know that various changes or equivalent substitutions can be made to these features and embodiments without departing from the spirit and scope of the present disclosure. In addition, in the teachings of the present disclosure, these features and embodiments may be modified to adapt a particular situation and material without departing from the spirit and scope of the present disclosure. Therefore, the present disclosure is not limited by the specific embodiments disclosed herein, and all embodiments falling within the scope of the claims of the present application fall within the protection scope of the present disclosure.

What is claimed is:

1. A planetary gear train transmission device of a hybrid vehicle, comprising an input shaft (11), an output shaft (14), a front-end motor (18), a rear-end motor (17), a first clutch (15), and a second clutch (16), wherein one end of the input shaft (11) is connected to an engine power system, and another end of the input shaft (11) is connected to the front-end motor (18) through a front-end planetary gear train; the second clutch (16) is mounted between the other end of the input shaft and the output shaft (14); the first clutch (15) is mounted between the front-end planetary gear train and the output shaft (14); the rear-end motor (17) is connected to the output shaft (14) through a rear-end planetary gear train; and selection of different speed ratios and different working modes are achieved by means of different combinations of the first clutch (15) and the second clutch (16) and different working states of an engine, the rear-end motor (17), and the front-end motor (18); wherein the front-end planetary gear train comprises a first sun wheel (21), a first planetary wheel (22), a second sun wheel (31), a second planetary wheel (32), a second outer tooth ring (34), and a second planetary frame (33); the rear-end planetary gear train comprises a third sun wheel (41), a third planetary wheel (42), a third outer tooth ring (44), and a third planetary frame (43); in the front-end planetary gear train, the second outer tooth ring (34) is fixedly constrained; the first planetary wheel (22) is rigidly connected to the second planetary wheel (32); the second sun wheel (31) and the second planetary frame (33) form a first speed ratio relation; the first sun wheel (21) and the second planetary frame (33) form a second speed ratio relation; the first sun wheel (21) and the second sun wheel (31) form a third speed ratio relation;

the other end of the input shaft (11) is connected to the second sun wheel (31) and one end of a second clutch inner hub (12); another end of the second clutch inner hub (12) is connected to the second clutch (16); one end of the second planetary frame (33) is connected to one end of the first clutch (15); the first clutch (15) and the second clutch (16) are jointly connected to one end of a clutch frame (13), and another end of the clutch frame (13) and one end of the third planetary frame (43) are jointly connected to the output shaft (14);

the rear-end motor (17) is connected to the third sun wheel (41), and the third outer tooth ring (44) is fixedly mounted on a housing (19);

the front-end motor (18) is connected to the first sun wheel (21); the second planetary wheel (32) and the first planetary wheel (22) are mounted on the second planetary frame (33); and the second outer tooth ring (34) is fixedly mounted on the housing (19).

2. The planetary gear train transmission device of the hybrid vehicle according to claim 1, wherein when the transmission device is in mode I-electric vehicle (EV): the first clutch (15) and the second clutch (16) are both disengaged, the engine and the front-end motor (18) do not work, and the rear-end motor (17) alone outputs power serving as a power source of the transmission device.

3. The planetary gear train transmission device of the hybrid vehicle according to claim 1, wherein when the transmission device is in mode II-series connection: the first clutch (15) and the second clutch (16) are both disengaged, the engine outputs power, and the front-end motor (18) receives the power output from the engine and transmits the received power to the rear-end motor (17) or stores the power energy in a battery; the rear-end motor (17) outputs power; and the power source of the rear-end motor (17) is the front-end motor (18) or the battery.

4. The planetary gear train transmission device of the hybrid vehicle according to claim 1, wherein when the transmission device is in mode III-direct drive I: the first clutch (15) is engaged, the second clutch (16) is disengaged, and the rear-end motor (17) does not work; when the battery has sufficient electricity, the front-end motor (18) does not receive the power; when the battery is required to be charged, the front-end motor (18) receives part of the power output by the engine, and the engine outputs power that is a power output of the transmission device.

5. The planetary gear train transmission device of the hybrid vehicle according to claim 1, wherein when the transmission device is in mode IV-direct drive II: the first clutch (15) is disengaged, the second clutch (16) is engaged, and the rear-end motor (17) does not work; when the battery has sufficient electricity, the front-end motor (18) does not receive the power; when the battery is required to be charged, the front-end motor (18) receives part of the power output by the engine, and the engine outputs power that is a power output of the transmission device.

6. The planetary gear train transmission device of the hybrid vehicle according to claim 1, wherein when the transmission device is in mode V-parallel connection I: the first clutch (15) is engaged, and the second clutch (16) is disengaged; when the battery has sufficient electricity, the front-end motor (18) does not work; when the battery is required to be charged, the front-end motor (18) receives part of the power output by the engine, and the engine and the rear-end motor (17) output power that is a power output of the transmission device.

7. The planetary gear train transmission device of the hybrid vehicle according to claim 1, wherein when the transmission device is in mode VI-parallel connection II: the first clutch (15) is disengaged, and the second clutch (16) is engaged; when the battery has sufficient electricity, the front-end motor (18) does not work; when the battery is required to be charged, the front-end motor (18) receives part of the power output by the engine, and the engine and the rear-end motor (17) output power that is a power output of the transmission device.

8. The planetary gear train transmission device of the hybrid vehicle according to claim 1, wherein when the transmission device is in mode VII-braking recovery: the first clutch (15) and the second clutch (16) are both disengaged, the rear-end motor (17) receives power generated by deceleration braking of a wheeling system.

9. The planetary gear train transmission device of the hybrid vehicle according to claim 1, wherein when the transmission device is in mode VIII-idle power generation: the first clutch (15) and the second clutch (16) are both disengaged; the rear-end motor (17) does not work, and the front-end motor (18) receives the power output by the engine and stores the received power energy in the battery.

* * * * *